March 13, 1956  W. R. WATSON  2,737,863
MACHINE FOR SETTING UP BOXES FROM FLAT BLANKS
Filed March 22, 1951  6 Sheets-Sheet 1
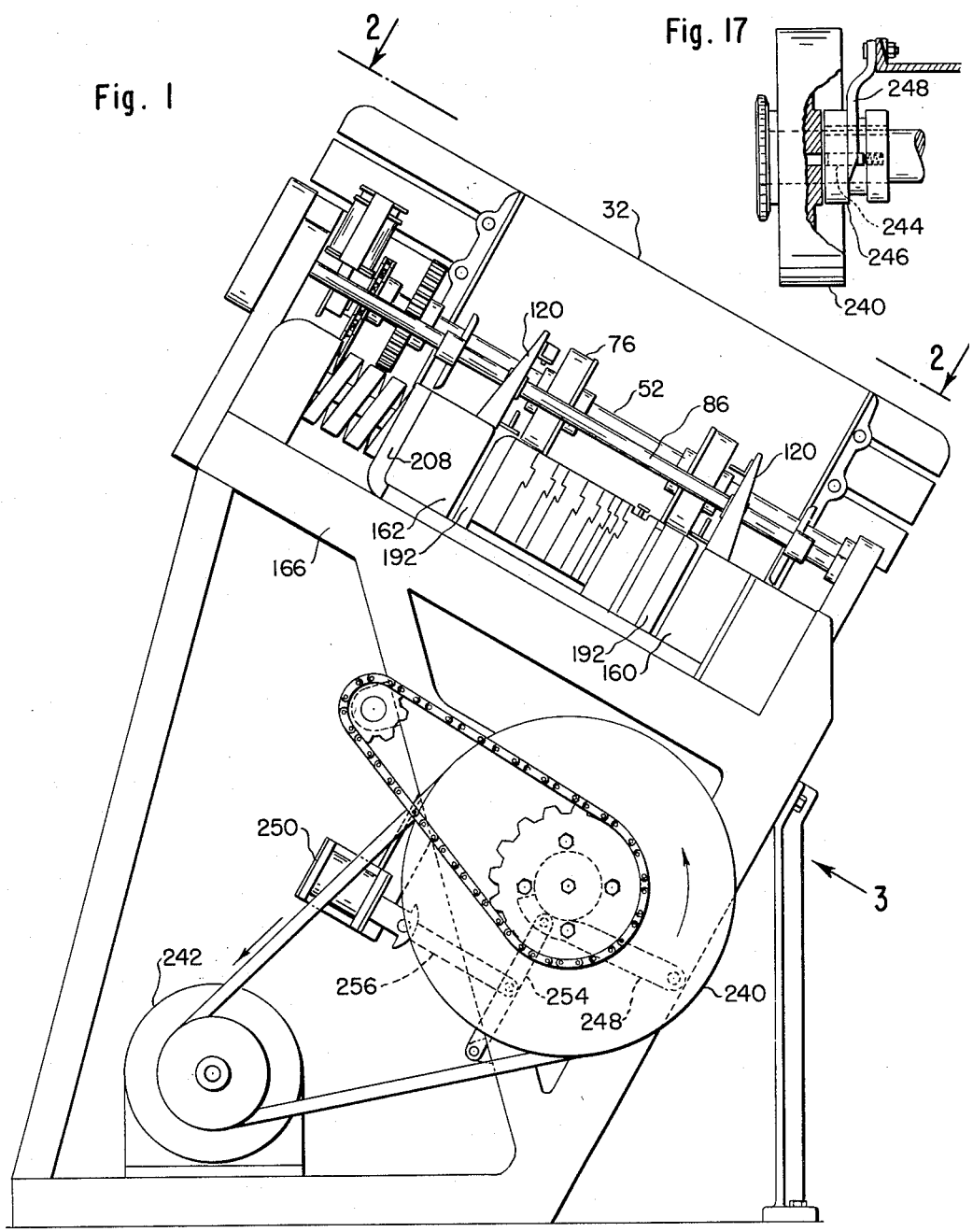
INVENTOR
WILLIAM RICHARD WATSON
BY Kenway, Jenney, Witter
& Hildreth
ATTORNEYS March 13, 1956  W. R. WATSON  2,737,863
MACHINE FOR SETTING UP BOXES FROM FLAT BLANKS
Filed March 22, 1951  6 Sheets-Sheet 2
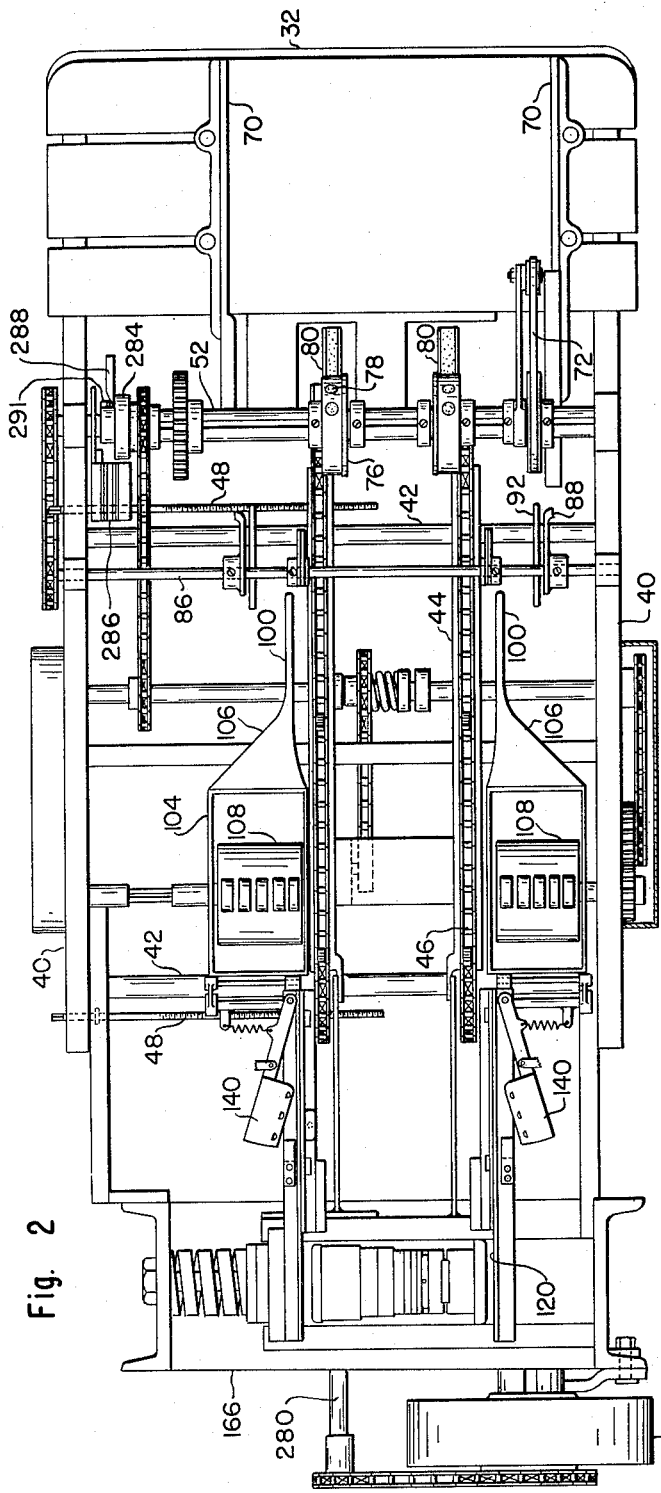
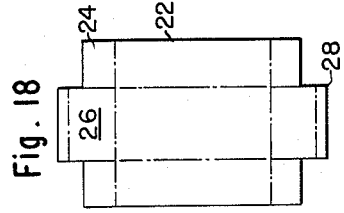
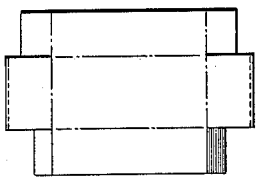
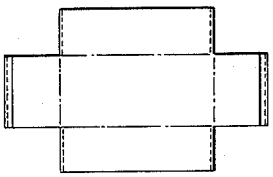
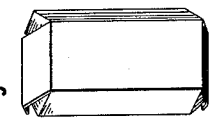
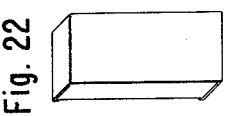
INVENTOR
WILLIAM RICHARD WATSON
BY Kenway, Jenney, Witter
& Hildreth
ATTORNEYS

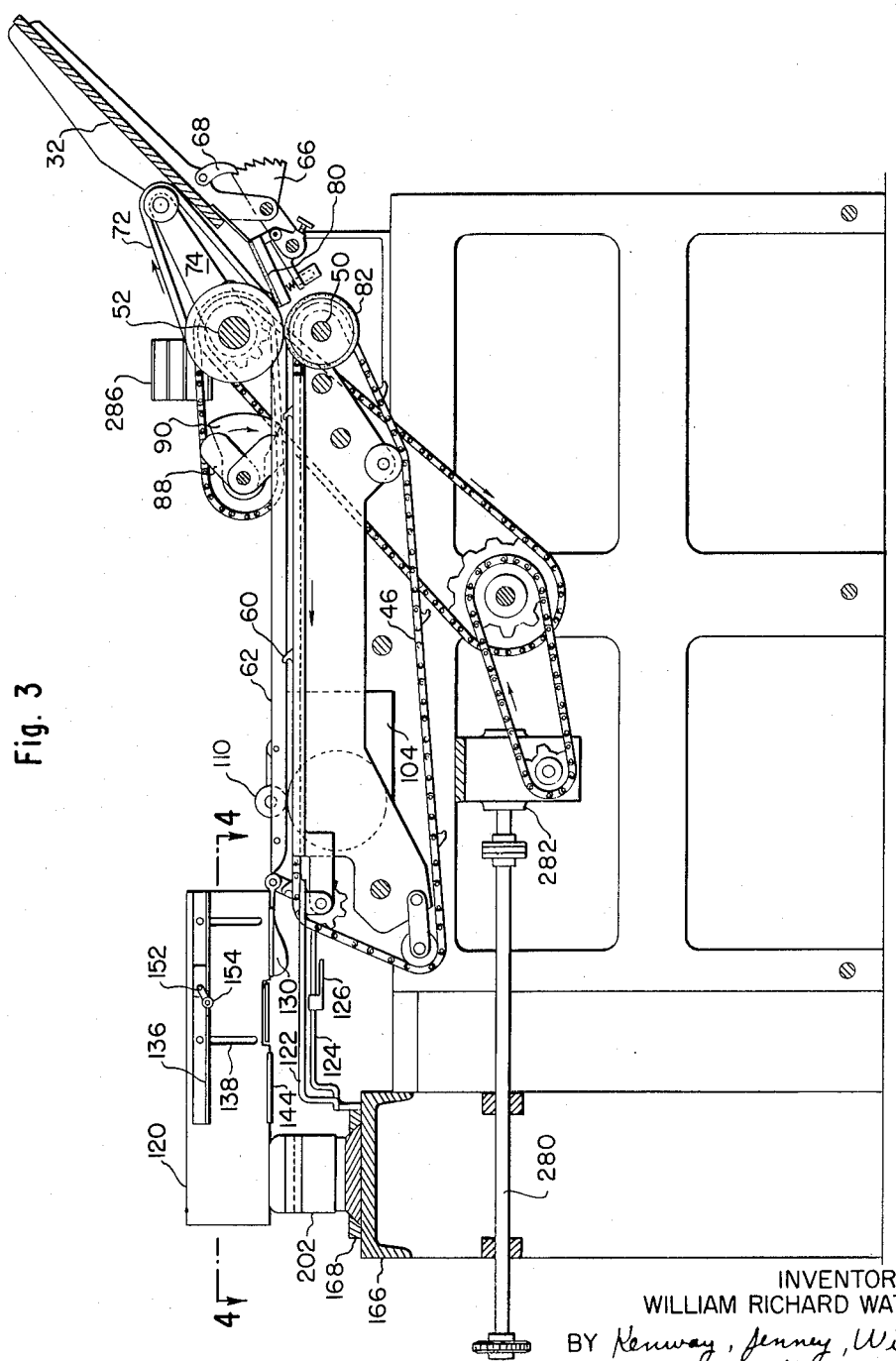

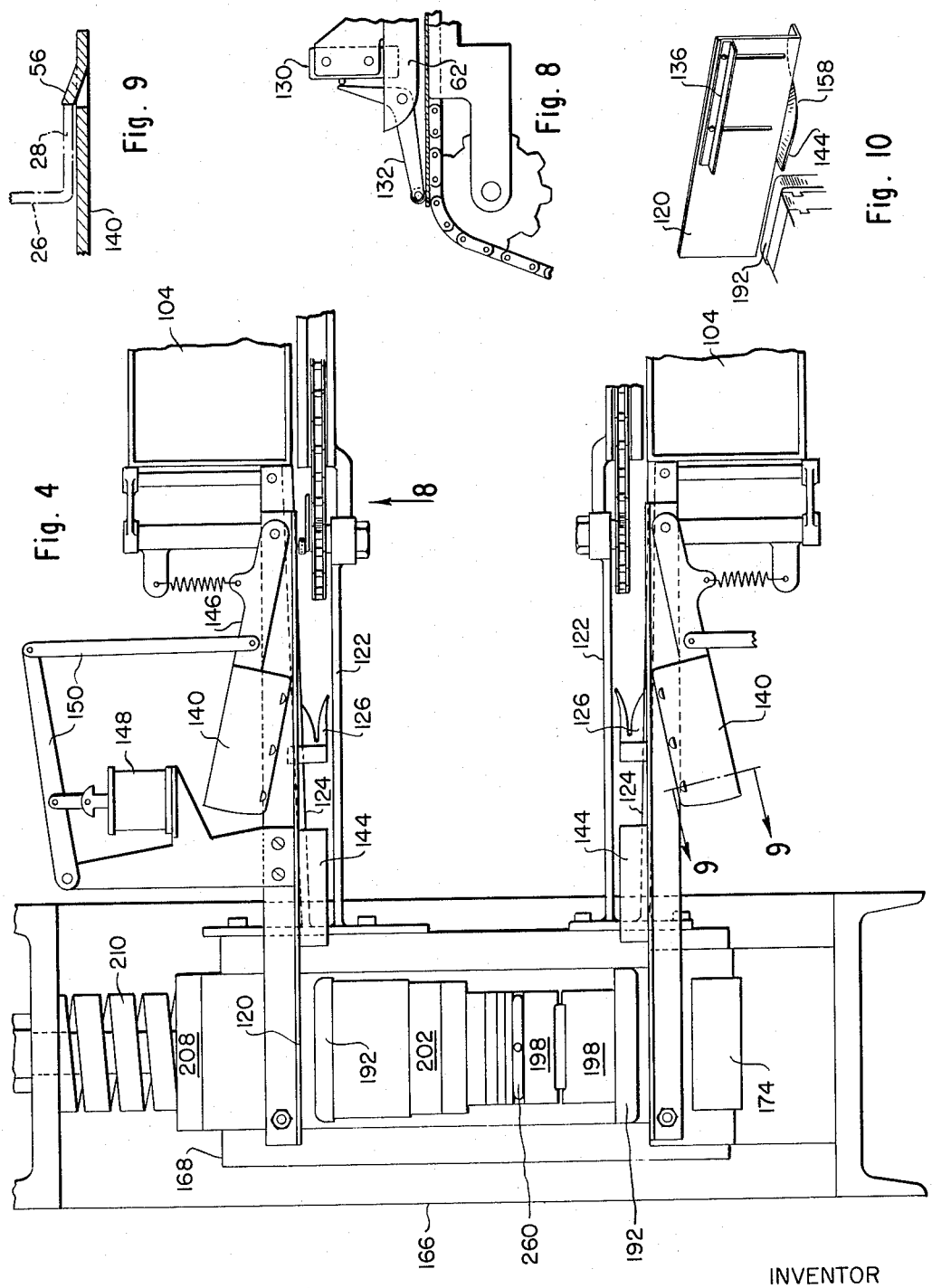

March 13, 1956 W. R. WATSON 2,737,863
MACHINE FOR SETTING UP BOXES FROM FLAT BLANKS
Filed March 22, 1951 6 Sheets-Sheet 5
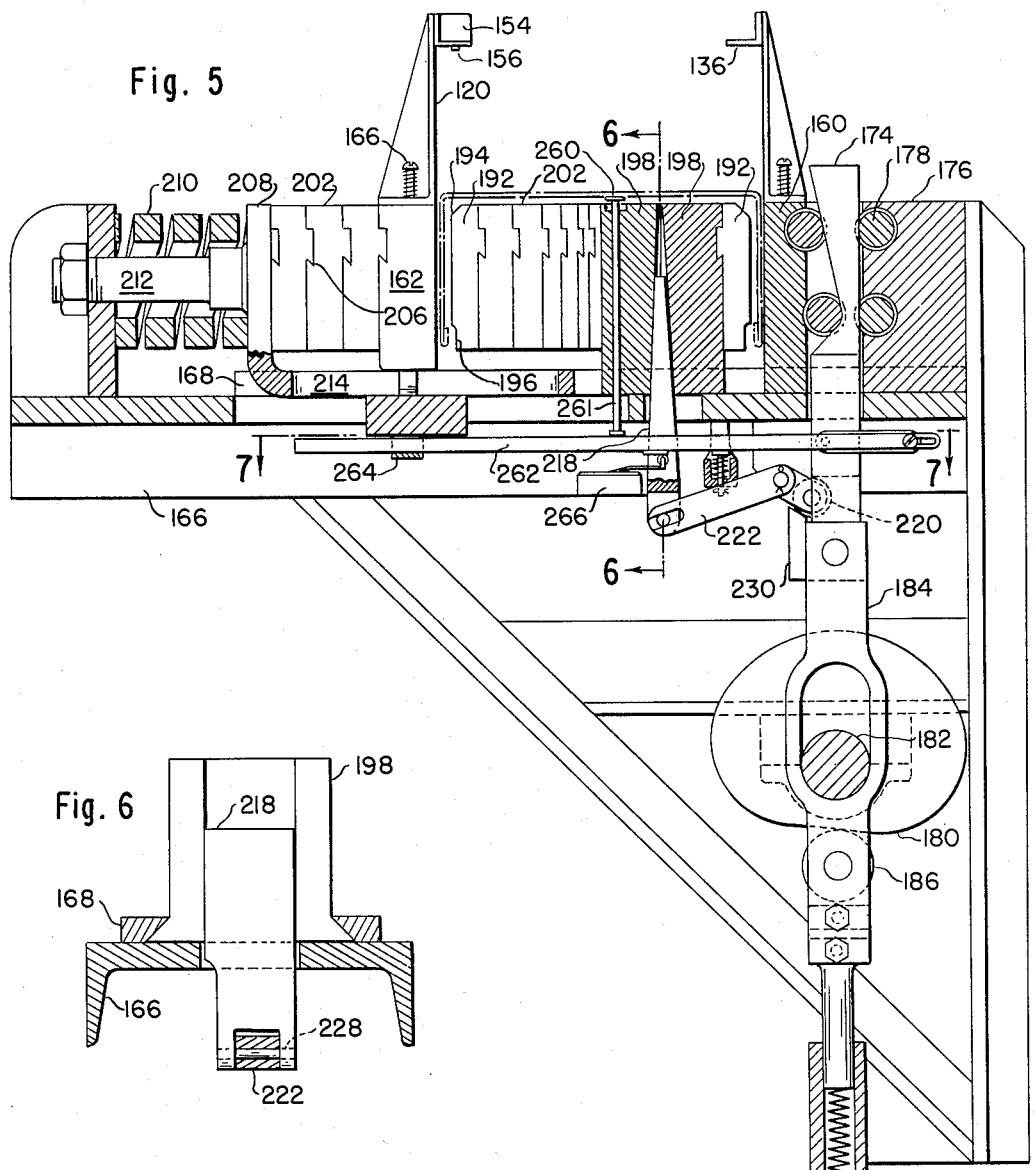
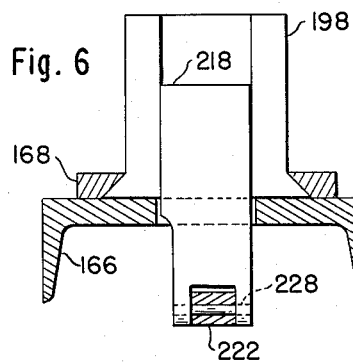
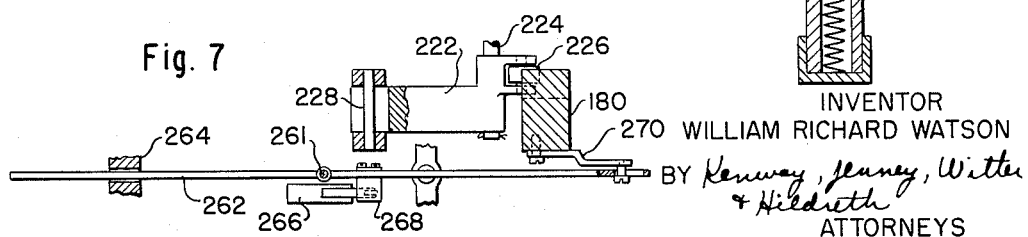
INVENTOR
WILLIAM RICHARD WATSON
BY Kenway, Jenney, Witter & Hildreth
ATTORNEYS March 13, 1956 W. R. WATSON 2,737,863
MACHINE FOR SETTING UP BOXES FROM FLAT BLANKS
Filed March 22, 1951 6 Sheets-Sheet 6
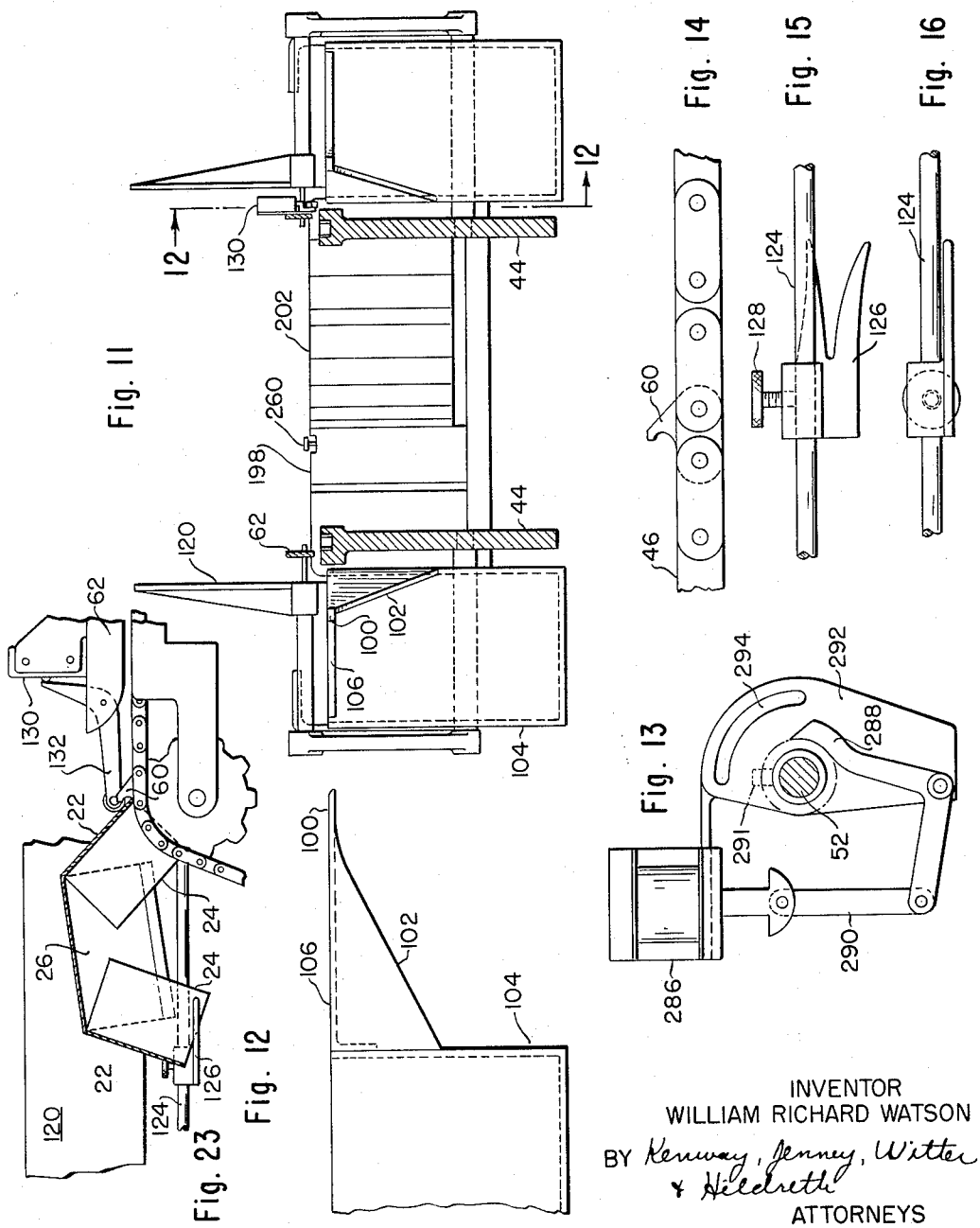
INVENTOR
WILLIAM RICHARD WATSON
BY Kenway, Jenney, Witter
& Hildreth
ATTORNEYS

United States Patent Office 2,737,863
Patented Mar. 13, 1956

2,737,863

MACHINE FOR SETTING UP BOXES FROM FLAT BLANKS

William Richard Watson, East Walpole, Mass., assignor to Bird & Son, Inc., East Walpole, Mass., a corporation of Massachusetts Application March 22, 1951, Serial No. 216,866

25 Claims. (Cl. 93—49)

The present invention relates to box-making machines and more particularly to machines by which boxes such as shoe cartons may rapidly be formed from flat blanks.

In general, the machines heretofore available for this purpose have been of two types. On the one hand, there have been the so-called full automatic machines wherein flat blanks are advanced automatically through various folding, gluing and pressing instrumentalities so as to provide a complete box. The rate of production on such machines may be relatively high, but machines of this type are elaborate, expensive, and difficult to adjust when the size of the box is to be changed. On the other hand, there have been the so-called semi-automatic machines wherein an operator manually performs certain of the folding operations and presents the partially formed box to operating instrumentalities which carry out the gluing and pressing operations. This procedure is carried out on one end of the box at a time, requiring that the operator then turn the partially completed box end for end and repeat the operation on the other end of the blank.

The present invention has as an object the provision of a new and improved box-making machine wherein certain of the box-forming operations may be carried out automatically while other operations, and more particularly those which are less suitable for fully automatic operation, may be carried out with the aid of the operator in manipulating the box and presenting it to the operating instrumentalities.

Another object of the invention is to provide a box-making machine in which manual and fully automatic operations are effectively combined, and wherein the entire operation of the machine from start to finish is carried out on both ends of the blanks simultaneously so that a complete box bottom, or lid as the case may be, is completed in a single passage through the machine.

Still another object of the invention is to provide a machine as above described wherein partially set-up boxes are automatically supplied to the operator at a point close to the final pressing station, the machine being so arranged that as soon as the operator takes up the automatically presented box, another partially formed box is brought into place ready for the operator.

In the drawings illustrating the invention in its several features, Fig. 1 is a view in end elevation, looking towards the left hand or press section of the machine; Fig. 2 is a top view of the machine taken in the direction 2—2 indicated in Fig. 1; Fig. 3 is a sectional view taken through the middle of the machine, looking in the direction designated by arrow 3 in Fig. 1; Fig. 4 is a top view of the left hand portion of the machine, showing the blank delivery station and the press section, taken on the line 4—4 of Fig. 3 on a somewhat larger scale than shown in Fig. 2; Fig. 5 is a sectional elevation through a portion of the press section and showing the actuating mechanism; Fig. 6 is a sectional detail taken on the line 6—6 of Fig. 5; Fig. 7 is a detail plan view, partly in section and taken on the line 7—7 of Fig. 5, illustrating features of the actuating and control mechanism of the press; Fig. 8 is a detail view in elevation showing the conveyor control switch, taken in the direction of arrow 8 indicated on Fig. 4; Fig. 9 is a detail sectional view through one of the tucker blades, taken on the line 9—9 of Fig. 4; Fig. 10 is a detail oblique view showing a modified form of tucker construction for the end wing extension; Fig. 11 is a transverse section through the upper portion of the machine, looking toward the gluing station; Fig. 12 is a detail view in side elevation taken on the line 12—12 of Fig. 11 and showing a corner lap separator; Fig. 13 is a detail view of the solenoid-actuated one-revolution clutch mechanism for the conveyor drive; Fig. 14 is a detail view of a portion of the conveyor chains showing one of the blank-engaging dogs; Figs. 15 and 16 are detail views in plan and elevation respectively showing the stops for intercepting the advancing blank as it is brought to the transfer station by the automatic supply mechanism; Fig. 17 is a detail view, partly in section and looking from below, of the one-revolution clutch for the press drive shown in Fig. 1; Figs. 18—22 inclusive are views showing the appearance of the blank at successive stages in the sequence of operations, the several views being positioned approximately opposite the stations of the machine of Fig. 2 where the respective forming operations take place, and Fig. 23 is a view showing the position of the box at the transfer point.

The machine of the present invention is intended primarily for use in setting up shoe cartons and similar types of boxes. Such boxes are formed from flat blanks of cardboard covered with a finish paper such as a printed wrapper. Blanks of the general contour of Fig. 18 are formed by cutting and scoring to form longitudinal side walls 22, corner laps 24, end wings 26 and end wing extensions 28. From such blank the completed box bottom is formed by folding the side walls along the longitudinal fold lines, folding in the corner laps, coating the inside surfaces of the end wings and end wing extensions with adhesive, folding the end wings onto the corner laps and the end wing extensions over the corner laps and into the box interior, and finally applying pressure to the end assembly to seal the parts.

In the machine of the present invention, these steps are carried out in rapid sequence and for the most part by power-driven mechanisms to which the blanks are presented automatically as they are caused to traverse the machine. Referring to Fig. 2 of the drawings, the blanks are advanced through the machine from right to left, the blanks being taken one by one from a stack piled on support 32. Upon removal from the stack, the individual blanks are taken up by conveyor means which carry the blanks past folding and gluing instrumentalities to a transfer station where the partially formed box is deposited ready to be taken up by the operator for the final operation. The machine is arranged so that as soon as the operator takes such partially formed blank from the transfer station, another prepared and partially folded blank is immediately brought to the transfer point, ready for the operator.

The final operation involves the pressing of the partially formed box in the press section, the press being actuated when the box is in place to cause sealing pressure to be applied to both ends simultaneously. As soon as the pressing cycle is completed, the operator removes the box from the press, places it on a stack of completed boxes and takes up another partially formed box from the transfer station. As a result, the speed of the machine is determined by the rapidity with which the operator carries out the pressing operation, the supply of partially formed boxes to the operator being automatically coordinated with the rate at which the pressing of the box ends is carried out.

The sequence of operations at the several stations of the machine is best illustrated by reference to Figs. 18—22.

Fig. 18 represents the flat blank, as stacked on support 32 and removed one by one as the machine operates. The first operations, performed in the region opposite Fig. 19, involve folding down the corner laps 24 while leaving the end wings outstanding in the plane of the central portion of the blank. The end wing extensions 28, however, are subjected to folding along their crease lines in order that the subsequent bending of said extensions around the corner laps may be carried out more easily. The blank with its corner laps downfolded is then advanced past the gluing station to cause the underside of the end wings and end wing extensions to be coated with the usual adhesive. The view Fig. 20 corresponds to the blank at the gluing station.

As the blank nears the end of its conveyor-driven advance, the longitudinal side walls are folded down at least part way and likewise the end wings are brought down into proximity to the inturned corner laps, so that the box comes to rest in approximately the condition shown in Fig. 21. For the sake of clarity, Fig. 21 is shown in slightly oblique fashion as is the view of the completed box, Fig. 22.

The box is now at the transfer point and the automatic supply mechanism comes to a stop. As soon, however, as the operator of the machine grasps the box by its sidewalls and takes it from the transfer point to the press, the conveyor mechanism is automatically restarted to carry another blank through the preliminary folding and gluing mechanism to the transfer point. In the meantime, the operator has brought the side-walls of the first mentioned box into substantial parallelism while at the same time bringing the box into position over the internal block assembly of the press. A direct downward push carries the ends of the box into the open spaces between pressing surfaces, and arrival of the box at the fully inserted position permits the operator by pressure on the box bottom to actuate a switch which immediately causes the press to close for a predetermined brief interval. As soon as the press opens, the box is withdrawn with both ends securely sealed to provide a completed box bottom as shown in Fig. 22.

In order that the partially formed box may be readily accessible to the operator for completion of the folding and presentation to the press, the entire machine is tilted toward the operator at an angle of approximately thirty degrees to the horizontal, as shown in Fig. 1. This not only brings the blank relatively close to the operator, but also permits the operator to grasp the blank at a convenient angle and to carry out the insertion and removal of the boxes at the press with a minimum of fatigue.

The machine comprises longitudinal frame members 40 joined by cross members 42. Intermediate the frame members are deep rails 44 (see Fig. 11) provided along their top with channels in which conveyor chains 46 are supported. The spacing between channels may be adjusted for different size boxes by means of long screws 48. The conveyor chains are driven by sprockets on a cross shaft 50 journaled in the frame below cross shaft 52.

The conveyor chain is provided at intervals with upstanding dogs 60 arranged to engage the trailing edge of a blank to advance the same past the various box-making devices. Hold down rails 62 mounted above the conveyor chain serve to maintain the side wings and central portion of the blank in a plane while allowing the end formations to project outwardly beyond the rails 44.

In the operation of the machine, the flat blanks are drawn off one by one from a stack piled on table 32 at the right hand end of the machine. The table is pivoted on a bracket 66 having teeth for engagement by pawl 68 to permit adjustment of the tilt of the table toward the pick-off means. The table is provided with side guides 70 to hold the stack in position. To aid in picking off one blank at a time from the stack, a belt 72 driven from shaft 52 runs over an idler pulley on the end of free-swinging arm 74. The belt is positioned adjacent the lower side wall and rests upon the uppermost blank of the stack. Also mounted on shaft 52 are disks 76 having friction inserts 78 disposed in their periphery to engage and advance a blank while the latter is supported by resiliently mounted platens 80. When so engaged, a blank is carried between the bite of the disks 76 and resilient rolls 82 mounted on lower cross shaft 50. The feed imparted by said rolls carries the blanks past means for folding down the corner laps 24 and for imparting a preliminary fold or break to the end wing extensions 28. This is accomplished by instrumentalities mounted on cross shaft 86 driven by chain and sprockets from shaft 52.

The folding down of the corner laps is effected by means of arms 88 mounted on the shaft 86 just outside the rails 44, while the end wing extensions 28 are bent downwardly relative to the end wings by means of sectors 90 which swing past fixed supports 92 on which the end wings ride.

The effect of the arms 88 is to push down the corner laps 24 so that said laps pass beneath fixed longitudinal extensions 100 disposed outside and in spaced relation to the main rails 44. The end wings, on the other end, are not engaged by arms 88 but instead are held against downward movement by supports 92 and as a result remain above extensions 100.

As the blank continues to advance, the corner laps are engaged by oblique plates or gussets 102 and directed into the space between the main rails 44 and the glue tanks 104. The end wings and end wing extensions ride on plates 106 into contact with glue rolls 108 running through the glue contained in said tanks. The usual idler rolls 110 serve to maintain contact between the underside of the wings and the glue rolls.

As the blank nears the limit of its automatically effected advance, further folding operations are carried out in order to leave the blank in a condition where it may readily be taken by the operator and transferred to the press. To this end, the side walls 22 are partially folded, and the end wings are brought down into proximity to the partially inturned corner laps, so that the box appears approximately as shown in Fig. 21. These folding operations are carried out by the advancing movement of the conveyor chain, acting in conjunction with the guiding means by which the machine operator is aided in transferring the partially folded box to the press.

The instrumentalities which act on the box at the point of transfer from the automatic feed to the hands of the operator are best illustrated in Figs. 3 and 4, which show spaced guide walls 120 extending toward the press section from the region above and just outside the conveyor chains 46. Mounted below the guide walls 120 are rods which take over from the conveyor chains the function of supporting the blank after it leaves the chains. Rods 122 are disposed inwardly of the conveyor chains while rods 124 are arranged slightly below rods 122 and just outside the conveyor chains. The outer rods 124 receive the downwardly extending corner laps of the blank as they leave the space between the glue tanks and the main rails, so as to lead the corner laps into the region between the inner and outer rods beyond the conveyor chains. The end wings, on the other hand, pass out from the space between the hold-down rails 62 and the conveyor chains, and advance beneath the guide walls 120 but over both sets of rods.

The advance of the conveyor chain, through the action of the feed dogs on the trailing edge of the blank, carries the blank body onto the supporting rods 122 until the leading edges of the downwardly extending corner laps are engaged by stops 126. These stops are adjustably mounted by means of thumb screws 128 on the outer rods 124, and are provided with divergent jaws to insure that the edges of the corner laps will enter the opening and be carried to the apex. The stops are so positioned longitudinally of the rods that the corner laps engage the stops while the conveyor still has a short distance to travel before coming to a halt.

The action of the stops on the leading edge of the corner laps while the blank is being urged ahead by the conveyor chain, acting on the trailing edge of the blank, results in bending the blank along its fold lines for the side walls. This causes the central portion of the blank to lift upwardly away from the rods into the region between the guide walls 120, as shown in Fig. 23. The conveyor end of these guide walls is supported in predetermined relation to the main rails 44 so that the spacing between walls is adjusted simultaneously with the adjustment of the rail spacing to provide a wall separation slightly greater than the longitudinal dimension of a finished box. Upon lifting of the central portion of the box away from the supporting rods, the end wings are engaged by the guide walls and folded down into proximity to the corner laps. The lower edges of the guide walls 120 may be provided with rounded portions 130 as shown in Fig. 3 to aid in bringing down the end wings as a result of this combined advancing and lifting motion of the blank during the final portion of the conveyor advance.

As the blank lifts upwardly between the guide walls 120, the conveyor chain is brought to a stop as a result of disengagement of the driving clutch. This driving clutch, forming a part of the driving connections hereinafter to be described, is under the control of a switch 130 actuated by feeler arm 132 positioned above and slightly to one side of one conveyor chain so as to detect the presence of a blank at that point. Engagement of the feeler by a blank serves to set the clutch so that disengagement takes place on completion of the revolution. Accordingly, when a blank has been brought to the transfer point, the conveyor chain comes to a stop with the blank lifted into the region between guide walls 120. Until the operator takes the blank from this point, the feeler remains in engagement with the trailing edge of the blank (see Fig. 23), and the conveyor remains at rest. As soon as the partially folded box is taken up by the operator and moved away from the transfer point toward the press, the feeler is released to cause switch 130 to bring about engagement of the clutch to restart the conveyor, in order that another partially folded blank may be brought to the transfer point ready for the operator as soon as the pressing of the first blank has been completed.

It will be noted that the condition of the blank at the transfer point is such that the adhesively coated end formations do not stick together in partially folded condition. The corner laps are restrained by guide rods 124 against outward movement, while the adhesively coated end wings lie outwardly of these rods although confined by the lower portions of the guide walls 120. As a result, the box parts do not become set in a position from which it is difficult to bring the end formations into proper alignment for the final pressing.

In taking up the partially folded box from the point where it is left by the automatic supply mechanism, the operator grasps the lower margins of the side walls approximately centrally thereof, in much the same manner as the box is held by the operator in carrying out the box forming operation on the conventional types of semiautomatic setting up machines heretofore available. By reason of the tilted arrangement of the machine, the operator is able easily to reach the box over the intervening mechanism with the box comfortably held at an angle of approximately 90 degrees to the direction of the operator's arms.

In grasping the box, the operator brings the side walls into substantial parallelism and at the same time lifts the box from the supporting rods 122, 124. This lifting movement raises the end wings and end wing extensions clear of the outer rods so that the box ends are now confined entirely by the guide walls 120.

The box is raised by the operator until stopped by rails 136, which are formed of angle stock and mounted on the inner faces of the guide walls 120. These rails may be secured in adjusted position by clamp screws passing through slots 138 in the guide walls.

The box is now advanced to the left by the operator, the box body being in inverted position with the bottom end portions sliding along the under side of the rails 136 and with the end formations loosely retained by the guide walls 120. To insure that the end wing extensions will be in position to be bent around the corner laps and into the interior of the box when the box ends are inserted into the spaces between pressing surfaces, means are provided for bringing the end wing extensions to a position approximately at 90 degrees to the end wings.

This infolding of the end wing extensions is accomplished by tucker blades 140 best illustrated in Figure 4 and arranged to move inwardly of the lower edge of the guide walls as soon as the box has been raised by the operator into contact with the top rail 136. The inward motion of these tucker blades bends the end wing extensions inwardly and holds them until the advance of the box by the operator toward the press has brought the extensions over fixed supports 144 extending inwardly from the lower edge of the guide walls substantially at the height of the tucker blades and in effect forming a continuation thereof toward the press.

The tuckers are mounted on arms 146 for swinging movement into and out of operating position, the blades being shown in Figure 4 in retracted position outside the guide walls 120. Actuation of the tuckers is effected by means of solenoids 148 acting through links 150, only one set of actuating linkages being illustrated in Figure 4. The tuckers are urged inwardly upon energization of the solenoids through operation of a switch 152 mounted on one of the top rails 136 (see Fig. 3), the switch being provided with a feeler arm 154 projecting below the under side of the rail so as to be actuated by contact with the box bottom when the box is raised to its upper position by the operator. In order that the tucker blades will not be withdrawn immediately upon deenergization of the solenoids, the blades are provided adjacent their innermost edges with upstanding lips 156 (see Figure 9) which catch on the margin of the inturned end wing extension 28, thereby preventing retraction of the tuckers until the advance of the box toward the press has carried the end wing extensions beyond said tuckers and onto the fixed supports 140.

As an alternative to the solenoid-actuated tucker blades for bringing the end wing extensions onto the supports 144, means may be employed as shown in the oblique detail view, Fig. 10, for turning the end wing extensions as the box is advanced. In this construction the guide walls 120 are provided at their lower edges with a warped or twisted surface 158 which turns progressively from a generally outward to an inward projection terminating in the supports 144 previously described, by which the wing extensions are supported in their transfer to the press.

As the box is carried to the left by the operator along the guide walls, it is brought into position for insertion in the press, by which the ends of the box are subjected to sealing pressure. In order that both ends may be acted on simultaneously, the press comprises external press members 160 and 162 which engage the outer ends of the box, and a central block assembly, over which the box fits, for supporting the box ends on the inside. This central block assembly is arranged for limited longitudinal expansion and contraction, being expanded to move outwardly against the box ends just before the full sealing pressure is applied by the external members. Immediately upon release of the outer members, the block assembly contracts sufficiently to permit the box readily to be lifted off and removed from the press.

To aid the operator in guiding the box into the press, the walls extend to and are mounted on the external press members 160, 162 with the guide surfaces flush with the pressing faces. Connection between the guide walls and the top of the press members is made by studs and springs, indicated at 166, to permit relative pivotal movement during opening and closing of the press. It will be observed in Fig. 3 that the top guide rails 136 and the supports 140 for the end wing extensions terminate before reaching the press, in order that the box may be lowered and raised without interference. The supports 144 serve to retain the end wing extensions substantially at right angles to the end wings while the box advance carries the extensions onto the top surfaces of the end blocks of the internal support, after which downward movement of the box causes the extensions to be bent around the end wings and corner laps into the interior of the box.

The press comprises a heavy frame or bed in the form of a channel member 166 supported transversely of the machine at the same angle of about 30° to the horizontal as the preceding blank supplying section. Secured to the top of the channel member are spaced ways 168, (see Fig. 6) which serve to retain and guide the external press members and the internal block assembly during opening and closing movement of the press. By reason of this mounting arrangement, pressure applied to one box end is transferred through the movable internal support to the other end, so that substantially equal pressures are applied to the box ends simultaneously.

To apply the requisite sealing pressure, powerful actuating means is provided for urging the parts together. A wedge 174 is mounted between a fixed abutment 176 and the lower press member 160, with rolls 178 to minimize friction in actuating and releasing the wedge. The wedge is drawn downwardly, when the press is operated, by means of a cam 180 on shaft 182, acting through yoke 184 and cam follower 186. The cam is rotated through one revolution during a pressing cycle, and approximates a cardioid in shape to provide a rapid closing, an appreciable dwell during which the full pressure is maintained, and a rapid release of pressure at the end of the cycle. A spring 188 acts on the lower end of the yoke to keep the cam roller in contact with the cam and cause the wedge to be raised to open the press.

The internal block assembly for supporting the box is made up of end blocks or formers 192 which engage the interior of the box ends. The top edges of these blocks are formed with an oblique surface 194 to aid in carrying the end wing extensions around and into the box when the box end formations are inserted. The formers are likewise provided at their lower margins with a shallow recess 196 to accommodate the extra thickness of box material resulting from the folded-over end wing extension.

The formers 192 are mounted on carrier blocks 198 arranged for sliding movement in the ways 168. To accommodate various lengths of boxes, spacer blocks 202 are employed between one of the formers and its supporting carrier block. These blocks are of various thicknesses and may be assembled in interlocking relation through the provision of sliding dovetail connections 206. Other blocks of the set are employed as spacers between the left-hand external press member 162 and its support 208. The member 208 is backed up by a heavy coil spring 210 under substantial initial compression as a result of stud 212, to permit a yield in the parts in the event the pressure becomes excessive. The support 208 is provided with a base comprising elongated dovetail members 214 which are slidingly retained by guideways 168. Except when the spacing is being adjusted, the external press member 162 is clamped to the base members 214 of the support 208 so as to move as a unit therewith.

To support the box against crushing when sealing pressure is applied, and yet permit the box readily to be inserted and removed, the internal block assembly is arranged to be expanded and contracted in timed relation to the operation of the press. This is accomplished by means of a supplementary wedge 218 which operates between the two carrier blocks 198. The wedge is actuated very rapidly during the initial downward movement of the main wedge 174, so that completion of the expanding movement of the block assembly occurs before external sealing pressure is applied to the box. The wedge angle is small, less than about 6 degrees, so that it remains in place to hold the block assembly separated while the full pressure is applied by the main wedge.

To actuate the supplemental wedge 218, the lower end of the main wedge 174 adjacent the point of connection to the yoke 184, is provided with a semicircular recess 220 (see Figs. 5 and 7). A lever 222 mounted on a pivotal support 224 is provided at one end with a cam roll 226, while the other end of the lever is slotted to permit sliding engagement with a pin 228 in the lower end of the wedge 218.

When the press is in open or released position, the main wedge 174 is at the top of its stroke, the cam roll 226 is in the recess 220, and the supplementary wedge 218 is in lowered position to permit the carrier blocks 198 to come together and thereby contract the internal block assembly. Upon initial downward movement of the main wedge 174, the cam roll 226 is carried downwardly to rock the lever 222 in a clockwise direction. By reason of the difference in relative lengths of the lever arms, the supplementary wedge 218 is driven upward to complete the expansion of the block assembly before the main wedge has moved more than a fraction of its stroke. Upon further downward movement of wedge 174, the cam roll 226 swings out of engagement with the recess, leaving the wedge free to complete its downward movement while the supplementary wedge remains in raised position. Upon upward movement of main wedge 174, cam roll 226 is engaged by abutment 230 to rock the lever 222 in counterclockwise direction and thereby pull the supplementary wedge 218 downwardly to permit carrier blocks 198 to come together and allow the formed box readily to be withdrawn from the internal support.

To rotate the cam 174 when the press is to be actuated, one-revolution clutch connections are provided between the shaft 182 and the continuously rotating fly wheel 240 driven by motor 242. The clutch (see Fig. 17) is of conventional construction, employing a hardened steel pin 244 which when allowed to move axially under the influence of a spring, will lock together the driving and driven members 240 and 246, respectively. The pin is provided with a head by which the pin can be withdrawn from engagement with the driving member when the clutch is to be disconnected. An arm 248 having a wedge-shaped end may be moved into the path of the pin so as to engage the head and withdraw the pin. So long as the arm 248 remains adjacent the hub, the pin will be held out of engagement with the driving member.

Actuation of the clutch control arm 248 is under the control of a solenoid 250, through the provision of a toggle 254, with a link 256 joining the mid-point of the toggle to the armature of the solenoid. Accordingly, when the solenoid is energized, the armature is pulled inwardly to break the toggle and swing the clutch control arm 248 out of the way of pin 244, thus permitting the pin 244 to seat in its recess in the driver 240 and cause the came 180 to rotate.

The actuation of the clutch is under the control of the operator of the machine and can be accomplished only when the box is fully inserted in the press. The arrangement is such that the operator applies pressure to the box bottom in the region where the hands normally rest, and this pressure is employed to actuate a switch in control of the solenoid 250. The switch actuating means comprises a small platen 260 mounted on a rod 261 passing upwardly through one of the carrier blocks 198. The platen normally projects slightly above the top surface of the carrier block, with a shallow recess in the block below the platen to permit the platen to move downwardly to a position substantially flush with the top when actuating pressure is applied.

The lower end of the push rod 261 rests upon a switch actuator 262 extending within and parallel to the press bed 166. The actuator is mounted for longitudinal sliding movement in guides 264, one guide having a spring pressed support to permit the actuator to yield downwardly when pressure is applied to platen 260. The actuator upon downward movement thereof is arranged to operate a switch 266 of the type responsive to small movements, the actuator being provided with a laterally extending plate 268 to engage the feeler arm of the switch. Thus, when the plate is in engagement with the feeler arm, downward movement of the actuator as a result of pressure applied to the platen will serve to operate the switch and energize the solenoid 250. The arrangement is such that the platen and push rod will operate the actuator wherever the carrier block 198 may be located along the press bed 166.

To prevent the press from repeating the cycle, in the event the operator continues to apply pressure to the box bottom and thereby keep the platen 260 depressed, the actuator 262 upon operation of the press is arranged to be moved longitudinally to carry the projecting plate 268 out of engagement with the switch feeler. This result is brought about by means of a link 270 pivotally connected at one end to the lower portion of the main wedge 174 and at the other end by a pivot pin received in a slot in the actuator 262. Upon downward movement of the wedge, therefore, the actuator is drawn to the left by link 270 as viewed in Figure 5 to carry the plate 268 out of engagement with the switch feeler, thereby permitting the switch contacts to open. This results in de-energizing solenoid 250 and causes the toggle 254 to straighten and bring clutch control arm 248 into the path of pin 244 to disconnect the clutch.

If the operator continues to hold the platen 260 depressed, the actuator 262 remains in the position to which it has been brought by the action of link 270 during downward movement of wedge 180, the force of the platen rod 261 being sufficient to hold the actuator 262 frictionally in place in its guides against the action of gravity. The slotted connection between the link 270 and the end of the actuator 262 permits the wedge to rise to its released position without requiring that the actuator 262 be drawn to its normal position. As soon, however, as the machine operator releases the pressure on the box, the spring pressed support in the right-hand guide for the actuator 262 restores the actuator to its normal level and it thereupon slides to its right-hand position under the influence of gravity. In such position, downward movement resulting from pressure on the platen 260 will be effective to cause the switch 266 to close and initiate another press cycle.

The driving connections for the blank supplying portion of the machine comprise chain and sprocket connections from the continuously rotating fly-wheel 240 to shaft 280 and speed reducer 282, and thence by chain and sprocket drives to the driver member 284 of a one-revolution clutch mounted on cross shaft 52. This clutch is under the control of a solenoid 286, with the clutch control connected by link 290 to the armature of the solenoid (see Fig. 13). When the solenoid is de-energized, the arm 288 is in its inward position, with its wedge-shaped end (see Fig. 2) in position to intercept and withdraw the drive pin 291 and thus disengage the clutch. To permit accurate adjustment of the stopped position of the conveyor so that the partially formed box may be brought to just the desired position when the conveyor comes to rest, the angular position of the clutch control mechanism is adjustable about shaft 52 as a center. This is accomplished by mounting the clutch release lever 288 on a bracket 292, to which the solenoid 286 is likewise attached. This bracket is provided with an arcuate slot 294 to permit it to be clamped in adjusted position to the machine frame.

The switch 130 which controls solenoid 286 is normally closed, so that when the feeler arm 132 is out of engagement with a blank, the circuit to the solenoid 286 is completed and the clutch control arm 288 is held out of the patch of pin 291 and the conveyor chains are driven to advance the blank. When a blank arrives at the feeler (Fig. 8) the switch is actuated to open the circuit, de-energizing the solenoid and causing arm 288 to move into the path of the drive pin 291. The angular position of support 292 is adjusted so that the clutch is disengaged to stop the conveyor with the box substantially in the position shown in Fig. 23, with the feeler 132 still in contact with the box to hold switch 130 open. The conveyor thus remains at rest until the box is picked up by the operator.

The initial movement of the partially formed box from this position causes the feeler arm to drop off the trailing edge of the box blank, with the result that the solenoid is energized to pull out arm 288 thereby allowing drive pin 291 to seat in rotating driver 284 and restart the conveyor to bring another prepared blank to the transfer point. The driving connections for the conveyor are preferably arranged to advance the blanks at a rate such that a prepared blank is normally ready and waiting for the operator upon completion of the pressing operation on the preceding blank; only in the case of an extremely rapid operator would it be likely to occur that the conveyor would run continuously to advance blanks without periodic brief disengagement of the driving clutch.

As a result of the work-controlled conveyor, with its automatic presentation of partially folded and adhesively coated blanks, the operator is able to achieve a high rate of production of boxes having well formed and thoroughly sealed ends. By causing the initial folding and glueing operations to be carried out automatically, the end wings and extensions are uniformly coated with adhesive over substantially the full width of the wing and extension, while the provision of a press-actuating control which must be operated by pressure through the bottom of the box insures that both ends of the box will be fully inserted between the pressing surfaces before the pressure is applied. Furthermore, the relatively short distance over which the operator is required to advance the box from the transfer point to the press, coupled with the favorable angle of the machine, permits the operator with a minimum of fatigue to achieve a high rate of production, approximating twice the rate normally obtained with the conventional types of machines operating on a single end of the box at a time.

The fact that both ends of the box are operated upon simultaneously actually simplifies the guiding of the box by the operator, by reason of the spaced guide walls between which the box slides during its transfer to the press from the point to which the blank has been brought by the conveyor. The operator need only grasp the side walls of the box to bring the walls into parallelism (inward movement beyond this position is limited by the infolded corner laps) and lift the box into engagement with the underside of top rails 154. Full guidance is thus afforded as the box is moved to the left to bring the box into aligned position over the internal support, whereupon a direct downward push carries the box ends between the pressing surfaces and permits the operator by pressure on the box bottom to actuate the switch and initiate a pressing cycle. The completed box is thereafter readily withdrawn, adequate clearance being provided by the combined retraction of the external press members and contraction of the internal block assembly.

The invention, although described in terms of a particular construction and arrangement, is not so limited, and comprehends modifications thereof within the scope of the appended claims.

I claim:
1. A box making machine for setting up boxes from flat blanks, comprising a power-actuated press to which the operator presents the blanks for simultaneously securing both ends of the box, power-driven conveyor means for advancing box blanks past gluing and folding instrumentalities to a transfer point adjacent the press, spaced guide walls extending from the transfer point to the press, and means in control of the conveyor drive and responsive to the presence of a box blank at the transfer point for stoping the conveyor when a prepared blank has been brought to the transfer point, and for restarting the conveyor as soon as the operator takes up the prepared blank.

2. A box making machine for setting up boxes from flat blanks, comprising a power-actuated press to which the operator presents the blanks for simultaneously securing both ends of the box, power-driven conveyor means for advancing box blanks past gluing and folding instrumentalities to a transfer point adjacent the press, spaced guide walls extending from the transfer point to the press, blank supporting members below said walls for receiving the prepared blank from the conveyor, means in control of the conveyor drive and responsive to the presence of a blank at the transfer point to stop the conveyor, stops for engaging the advancing blank just prior to the stopping of the conveyor to cause the blank to be folded along its fold lines for the side wings, the conveyor control means being operative to restart the conveyor and bring another prepared blank to the transfer point as soon as the operator takes up the previously presented blank.

3. A box making machine for setting up boxes from flat blanks, comprising a power-actuated press to which the operator presents the blanks for simultaneously securing both ends of the box, power-driven conveyor means for advancing box blanks past gluing and folding instrumentalities to a transfer point adjacent the press, spaced guide walls extending from the transfer point to the press, means in control of the conveyor drive and responsive to the presence of a box blank at the transfer point for stopping the conveyor, and means for causing the blank, just prior to the stopping of the conveyor, to be folded along the fold lines for the side walls and to be raised upwardly between the guide walls.

4. A box making machine for setting up boxes from flat blanks comprising a power-actuated press having pressing instrumentalities for operating on both ends of the box simulataneosuly, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, and means for actuating the conveyor to cause partly folded and adhesively prepared blanks to be delivered to the transfer point between said guide walls in timed relation to the rate at which the machine operator carries out the pressing operation.

5. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, blank supporting members below the guide walls for supporting the box at the transfer point with the end wings separated by said members from the corner laps, means for stopping the conveyor when a box blank reaches the transfer point, and stops on said guide members for engaging leading edge portions of the advancing blank just prior to the stopping of the conveyor to cause the blank to be folded along its fold lines for the side wings and to lift upwardly into the space between the guide walls.

6. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, and pairs of spaced blank supporting members below the guide walls for receiving the box blank from the conveyor at the transfer point with the corner laps separated from the end wings of the blank by the inner member of each pair.

7. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, a pair of spaced blank supporting members below each guide wall for receiving the box blank from the conveyor at the transfer point, the said members being positioned to receive the end wings of the blank between the outer member and the guide wall, and the corner laps of the blank between the inner and outer members.

8. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, guide rails disposed inwardly of the guide walls and extending from the region above the transfer point toward the press for limiting upward movement of the box during its advance by the operator to the press.

9. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, guide rails disposed inwardly of the guide walls in adjustable position heightwise thereof and extending from the region above the transfer point toward the press for guiding the box in heightwise position toward the press after the operator has taken up the box from the transfer point.

10. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, guide rails inwardly of the walls for guiding the box in heightwise position toward the press during the advance of the box by the operator from transfer point to the press, and means adjacent the lower edges of the guide walls for engaging the end wing extensions of the blank to carry said portions of the blank onto the top of the inner pressing members of the press.

11. A box making machine for setting up boxes from flat blanks comprising a power-actuated press having pressing instrumentalities for operating on both ends of the box simultaneously, power-driven conveyor means for advancing box blanks past gluing and folded instrumentalities to a transfer point adjacent the press, spaced guide walls extending from the transfer point to the press with said walls substantially coincident with the pressing instrumentalities which engage the outer ends of the box, guide rails inwardly of the walls for guiding the box in heightwise position toward the press during the advance of the box by the operator from transfer point to the press, and means adjacent the lower edges of the guide walls for engaging the end wing extensions of the blank to carry said portions of the blank into the top of the inner pressing members of the press said means comprising pivotally mounted arms and actuating connections for causing said arms to swing inwardly of the walls when a box has been lifted by the operator from the transfer point into contact with the guide rails.

12. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, guide rails inwardly of the walls for guiding the box in heightwise position toward the press during the advance of the box by the operator from transfer point to the press, and means adjacent the lower edges of the guide walls for engaging the end wing extensions of the blank to carry said portions of the blank onto the top of the inner pressing members of the press said means comprising tucker arms pivotally mounted to swing inwardly of the walls into engagement with the end wing extensions, actuating means for said arms, and a control therefor responsive to the presence of a box in lifted position against the guide rails for causing the tucker arms to carry the end wing extensions inwardly of the end wings.

13. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, guide rails inwardly of the walls for guiding the box in heightwise position toward the press during the advance of the box by the operator from transfer point to the press, and means adjacent the lower edges of the guide walls for engaging the end wing extensions of the blank to carry said portions of the blank onto the top of the inner pressing members of the press, said means comprising tucker arms pivotally mounted for swinging movement inwardly of the walls, solenoid means for actuating the arms, and a control switch therefor, said switch being mounted adjacent one of the top guide rails for engagement by the lifted box during its advance by the operator from the transfer point to the press.

14. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, guide rails inwardly of the walls for guiding the box in heightwise position toward the press during the advance of the box by the operator from transfer point to the press, and means adjacent the lower edges of the guide walls for engaging the end wing extensions of the blank to carry said portions of the blank onto the top of the inner pressing members of the press, said means comprising tucker arms pivotally mounted for swinging movement inwardly of the walls, solenoid means for actuating the arms, and a control switch therefor, said switch being mounted adjacent one of the top guide rails for engagement by the lifted box during its advance by the operator from the transfer point to the press said tucker arms having means for retaining said arms in inward position, following actuation of the switch, until completion of the folding of the end wing extensions.

15. A box making machine for setting up boxes from flat blanks comprising a power-actuated press having pressing instrumentalities for operating on both ends of the box simultaneously, power-driven conveyor means for advancing box blanks past gluing and folding instrumentalities to a transfer point adjacent the press, spaced guide walls extending from the transfer point to the press with said walls substantially coincident with the pressing instrumentalities which engage the outer ends of the box, guide rails inwardly of the walls for guiding the box in heightwise position toward the press during the advance of the box by the operator from transfer point to the press, and means adjacent the lower edges of the guide walls for engaging the end wing extensions of the blank to carry said portions of the blank onto the top of the inner pressing members of the press, said means including supporting portions for the end wing extensions disposed inwardly of the guide wall approximately perpendicular thereto and extending toward the press slightly above the height of the top edges of the inner pressing instrumentalities thereof.

16. A box making machine for setting up boxes comprising a power-actuated press to which the operator presents an adhesively prepared and folded box blank for sealing both ends of the box simultaneously, said press comprising an internal support over which the box is positioned, external press members for engaging the outer ends of the box, a wedge for actuating one of said external members to apply sealing pressure to the box, a supplementary wedge for expanding the internal support outwardly against the box ends, and means for actuating said wedges to cause the supplementary wedge to complete the expansion of the internal support prior to the application of full sealing pressure to the outside of the box ends.

17. A box making machine for setting up boxes comprising a power-actuated press to which the operator presents an adhesively prepared and folded box blank for sealing both ends of the box simultaneously, said press comprising an internal support over which the box is positioned, external press members for engaging the outer ends of the box, a wedge for actuating one of said external members to apply sealing pressure to the box, a supplementary wedge for expanding the internal support outwardly against the box ends, cam-actuated connections for operating the wedge for the external press member, and means actuated by the initial press-closing movement of the wedge for causing the supplementary wedge to expand the internal block assembly outwardly against the ends of the box before full sealing pressure is applied to the outside of the box ends.

18. A box making machine for setting up boxes comprising a power-actuated press to which the operator presents an adhesively prepared and folded box blank for sealing both ends of the box simultaneously, means for actuating the wedge for the external press member including a cam, a cam follower, and a connecting member between follower and wedge, and means for actuating the supplementary wedge comprising a camming surface on the connecting member, a lever adapted to be rocked by said camming surface, and connections between the lever and the supplementary wedge to cause said wedge to expand the internal support outwardly against the box ends.

19. A box making machine for setting up boxes comprising a power-actuated press to which the operator presents an adhesively prepared and folded box blank for sealing both ends of the box simultaneously, said press comprising an internal support over which the box is positioned, external press members for engaging the outer ends of the box, a wedge for actuating one of said external members to apply sealing pressure to the box, a supplementary wedge for expanding the internal support outwardly against the box ends, reciprocating connections for actuating the main wedge for the external press member, said connections comprising a cam, a cam follower and link connected to the main wedge, and means actuated by the link for actuating the supplementary wedge to expand the internal support during the initial motion of the main wedge in pressure-applying direction, and for contracting the internal support following the release of external pressure.

20. A box making machine for setting up boxes comprising a power-actuated press to which the operator presents an adhesively prepared and folded box blank for sealing both ends of the box simultaneously, said press comprising an internal support over which the box is positioned, external press members for engaging the outer ends of the box, a main wedge disposed between one of said external press members and an abutment, said wedge being shaped to move the press member toward the box end upon downward movement of the wedge, connections including a cam, cam follower, and connecting link for pulling the wedge downwardly, a one-revolution clutch for driving the cam, a supplementary wedge disposed between relatively movable members of the internal support, and connections actuated by initial downward movement of the main wedge for causing the supplementary wedge to expand the internal support into contact with the box ends prior to the completion of the downward pressure-applying movement of the main wedge.

21. A box making machine for setting up boxes comprising a power-actuated press to which the operator presents and adhesively prepared and folded box blank for sealing both ends of the box simultaneously, said press having an internal support over which the box is positioned, the support comprising relatively movable members, a wedge intermediate said members, said wedge having an included angle of approximately six degrees so as to remain in wedging position until withdrawn, and means for automatically driving said wedge between the members a distance to bring the support into firm engagement with the box ends prior to the application of sealing pressure to the outside of the box ends.

22. A box making machine for setting up boxes from flat blanks, comprising a press to which the operator presents folded and adhesively prepared blanks for sealing both ends of the box simultaneously, the press having an internal support over which the box is positioned, movable press members for engaging the outer ends of the box, and guide walls between which the box is advanced to the press, said guide walls being connected to and movable with the external press members with the guiding surface of the walls substantially coincident with the box-engaging faces of the external press members.

23. A box making machine for setting up boxes from flat blanks, comprising a press to which the operator presents folded and adhesively prepared blanks for sealing the end formations, the press comprising a support for the interior of the end formation, a movable pressing member for engaging the outside of the box end, and a guide wall for directing the box end into the space between the support and the outer pressing member said guide wall being connected to the movable press member with its guide surface substantially coincident with the pressing face thereof.

24. A box making machine for setting up boxes from flat blanks, comprising a press to which the operator presents folded and adhesively prepared blanks for sealing the end formations, the press comprising a support for the interior of the end formation, a movable pressing member for engaging the outside of the box end, a guide wall for directing the box end into the space between the support and the outer pressing member and means connecting the guide wall to the movable press member to maintain the guide surface of the wall substantially coincident with the pressing face of the press member while permitting limited relative motion between guide wall and pressing member as the latter moves during the pressing operation.

25. A box making machine for setting up boxes from flat blanks, comprising a power-actuated press to which an operator presents folded and adhesively prepared blanks for sealing both ends of the box simultaneously, the press comprising an internal support over which the box is positioned by the operator, external press members for engaging the outer ends of the box, actuating mechanism including a clutch for causing the external members to apply sealing pressure to the box ends, a solenoid for actuating the clutch, and a switch in control of the solenoid, said switch including an actuator positioned to engage the interior of the box bottom when the box is in place on the support, said actuator being responsive to pressure applied by the operator to the box bottom to initiate a pressing operation, the actuator being disposed intermediate the ends of the internal support substantially in the region beneath the base portions of the operator's hands on the box.

References Cited in the file of this patent

UNITED STATES PATENTS

| Re. 16,193 | Goss | Oct. 27, 1925 |
| 829,995 | Odenkirchen | Sept. 4, 1906 |
| 1,680,615 | Hoba | Aug. 14, 1928 |
| 2,042,472 | Knowlton | June 2, 1936 |
| 2,070,310 | Ostler | Feb. 9, 1937 |
| 2,099,230 | Rix | Nov. 16, 1937 |
| 2,561,485 | Sillars | July 24, 1951 |